United States Patent
Ding et al.

(10) Patent No.: US 10,721,115 B2
(45) Date of Patent: Jul. 21, 2020

(54) CONTENT SHARING METHOD, TERMINAL, SERVER, AND SYSTEM

(71) Applicant: Huawei Technologies Co., Ltd., Shenzhen (CN)

(72) Inventors: Yu Ding, Wuhan (CN); Fumin Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 15/638,054

(22) Filed: Jun. 29, 2017

(65) Prior Publication Data
US 2017/0302499 A1    Oct. 19, 2017

Related U.S. Application Data

(63) Continuation of application No. PCT/CN2014/095956, filed on Dec. 31, 2014.

(51) Int. Cl.
*H04L 29/06* (2006.01)
*H04L 29/02* (2006.01)
*H04L 29/08* (2006.01)

(52) U.S. Cl.
CPC ............ *H04L 29/06* (2013.01); *H04L 29/02* (2013.01); *H04L 67/1095* (2013.01); *H04L 67/2857* (2013.01)

(58) Field of Classification Search
CPC . H04L 67/06; H04L 67/1095; H04L 67/2857; H04L 67/1097; H04L 65/1016; H04L 67/104; H04L 29/08117; G06F 3/067; G06F 16/152
See application file for complete search history.

(56) References Cited

U.S. PATENT DOCUMENTS

| | | | |
|---|---|---|---|
| 9,137,131 B1 * | 9/2015 | Sarukkai | H04L 43/0876 |
| 9,450,784 B2 * | 9/2016 | Schmidt | H04L 12/6418 |
| 2003/0033428 A1 * | 2/2003 | Yadav | H04L 29/06 709/238 |
| 2005/0050211 A1 * | 3/2005 | Kaul | H04L 29/06027 709/229 |

(Continued)

FOREIGN PATENT DOCUMENTS

| | | |
|---|---|---|
| CN | 102308290 A | 1/2012 |
| CN | 102651751 A | 8/2012 |

(Continued)

*Primary Examiner* — Kamal B Divecha
*Assistant Examiner* — Alex H. Tran
(74) *Attorney, Agent, or Firm* — Slater Matsil, LLP

(57) ABSTRACT

Embodiments provide a content sharing method and system. A source terminal cloud server receives a content sending command sent by a source terminal, where the content sending command carries an address of a destination terminal cloud server. The source terminal cloud server sends a connection request to the destination terminal cloud server according to the address of the destination terminal cloud server, where the connection request is used to request to establish a connection to the destination terminal cloud server. The source terminal cloud server sends shared content to the destination terminal cloud server after the connection is established. After the shared content is transferred between the cloud servers, terminals respectively log in to their respective cloud servers.

11 Claims, 9 Drawing Sheets

(56) References Cited

U.S. PATENT DOCUMENTS

| | | | | |
|---|---|---|---|---|
| 2009/0307302 A1* | 12/2009 | Tennant | | G06F 16/172 709/203 |
| 2011/0022812 A1* | 1/2011 | van der Linden | | G06F 9/5077 711/163 |
| 2012/0058721 A1* | 3/2012 | Fok | | H04L 67/06 455/41.1 |
| 2012/0278622 A1* | 11/2012 | Lesavich | | H04W 4/60 713/168 |
| 2013/0054634 A1* | 2/2013 | Chakraborty | | H04L 67/1091 707/769 |
| 2013/0124617 A1* | 5/2013 | Lee | | H04L 67/1097 709/203 |
| 2013/0235044 A1* | 9/2013 | Kaleta | | G06F 3/0484 345/473 |
| 2013/0282920 A1* | 10/2013 | Zhang | | H04L 45/74 709/238 |
| 2014/0136893 A1* | 5/2014 | Xie | | G06F 11/0793 714/15 |
| 2014/0181916 A1* | 6/2014 | Koo | | H04W 12/08 726/4 |
| 2014/0229457 A1* | 8/2014 | Sydell | | G06F 16/182 707/698 |
| 2014/0359047 A1* | 12/2014 | Lee | | H04L 67/2852 709/213 |
| 2015/0067109 A1* | 3/2015 | Tang | | H04L 67/1097 709/219 |
| 2015/0089028 A1* | 3/2015 | Zheng | | H04W 28/00 709/219 |
| 2015/0120843 A1* | 4/2015 | Cornwall | | H04L 51/10 709/206 |
| 2015/0195264 A1* | 7/2015 | Finlayson | | G06F 21/10 726/6 |
| 2015/0207847 A1* | 7/2015 | Kim | | H04L 67/306 709/204 |
| 2016/0191618 A1* | 6/2016 | Shi | | H04L 67/1095 707/610 |

FOREIGN PATENT DOCUMENTS

| | | |
|---|---|---|
| CN | 103095553 A | 5/2013 |
| CN | 104243567 A | 12/2014 |

* cited by examiner

CONTENT SHARING METHOD, TERMINAL, SERVER, AND SYSTEM

CROSS-REFERENCE TO RELATED APPLICATIONS

This application is a continuation of International Application No. PCT/CN2014/095956, filed on Dec. 31, 2014, the disclosure of which is hereby incorporated by reference in its entirety.

TECHNICAL FIELD

The present invention relates to the field of communications technologies, and in particular, to a content sharing method, terminal, server, and system.

BACKGROUND

At present, functions of a mobile phone become increasingly powerful, and a photo shooting function of a mobile phone also becomes increasingly powerful. However, storage space of a mobile phone is limited. Therefore, most of various mobile phone manufacturers provide a cloud server or a web disk for a user to store data such as a photo and an address book.

A Communication as a Service (CaaS) software development kit (SDK) is an application software development platform, and a telecommunication capability such as Voice over Internet Protocol VoIP, instant messaging, file sharing, picture sharing, or audio and video conferencing is open to the outside by using an application programming interface (API) interface. This solution is developed based on the Session Initiation Protocol (SIP). In a current picture sharing solution, after a user of a source terminal selects a local file, the source terminal invokes an API interface provided by an SDK to send the file. The file may be sent in two manners. In one manner, when a rich communication suite (RCS) server is configured in a store-and-forward mode, the local file is first sent to the RCS server, that is, an RCS server of an operator on a live network, and after the RCS server finishes receiving the local file, the RCS server sends the file to a receiver. In the other manner, when the RCS server is configured in a point-to-point mode, after a destination terminal receives a content sharing request and choose to accept the request, the file may be sent to the receiver by using the RCS server without waiting for the file to be completely sent to the RCS server.

In the foregoing technical solution, when the RCS server is configured in the store-and-forward mode, it is necessary to wait for shared content to be completely sent to the server, and then the server instructs a user to receive the shared content. In this way, time required from sending the shared content by a sender to receiving the shared content by a receiver is excessively long, thereby affecting user experience. When the RCS server is configured in the point-to-point mode, the server instructs the receiver to receive the file without waiting for the shared content to be completely sent by the sender, which reduces time when compared with time used in the store-and-forward mode. However, this process relies on network environments of two parties, and a relative slow network speed of either party affects total transfer time of a sharing process.

SUMMARY

In view of the foregoing mentioned technical problems existing in the prior art, embodiments of the present invention provide a content sharing method, terminal, server, and system. In the embodiments of the present invention, after shared content is transferred between cloud servers, terminals respectively log in to their respective cloud servers, so that the shared content may be browsed and operated.

According to a first aspect, a content sharing method is provided. The method includes receiving, by a source terminal cloud server, a content sending command sent by a source terminal, where the content sending command carries an address of a destination terminal cloud server. The method also includes sending, by the source terminal cloud server, a connection request to the destination terminal cloud server according to the address of the destination terminal cloud server, where the connection request is used to request to establish a connection to the destination terminal cloud server. The method also includes sending, by the source terminal cloud server, shared content to the destination terminal cloud server after the connection is established.

With reference to the first aspect, in a first possible implementation manner, before the step of receiving, by a source terminal cloud server, a content sending command sent by a source terminal, the method further includes: obtaining, by the source terminal, the address of the destination terminal cloud server from a destination terminal.

With reference to the first possible implementation manner of the first aspect, before the step of receiving, by a source terminal cloud server, a content sending command sent by a source terminal, the method further includes: receiving, by the source terminal cloud server, an ID that is of the shared content and sent by the source terminal, obtaining a corresponding random verification code according to the ID of the shared content, returning the random verification code corresponding to the ID of the shared content to the source terminal, and determining, by the source terminal according to the ID of the shared content and the random verification code, whether the shared content is uploaded.

With reference to the first aspect or the first possible implementation manner of the first aspect, in a second possible implementation manner, the method further includes: operating, by the destination terminal, the shared content by using the destination terminal cloud server.

With reference to the first aspect, or the first possible implementation manner of the first aspect, or the second possible implementation manner of the first aspect, in a third possible implementation manner, the method further includes: receiving, by the source terminal cloud server, a login request sent by the source terminal, where the login request carries login verification information.

According to a second aspect, a content sharing method is provided. The method includes sending, by a source terminal, a request for obtaining an address of a destination terminal cloud server to a destination terminal, and receiving the address of the destination terminal cloud server returned by the destination terminal. The method also includes sending, by the source terminal, a content sending command to a source terminal cloud server, where the content sending command carries the address of the destination terminal cloud server. The method also includes sending, by the source terminal cloud server, a connection request to the destination terminal cloud server according to the address of the destination terminal cloud server. The method also includes sending, by the source terminal cloud server, shared content to the destination terminal cloud server after a connection is established.

With reference to the second aspect, in a first possible implementation manner of the second aspect, the method further includes: determining, by the source terminal, an ID of the shared content according to locally stored information, and sending the ID of the shared content to the source terminal cloud server; obtaining, by the source terminal cloud server according to the ID that is of the shared content and sent by the source terminal, a random verification code corresponding to the ID of the shared content, and returning the random verification code corresponding to the ID of the shared content to the source terminal; and verifying, by the source terminal according to the ID of the shared content and the received random verification code, whether the received random verification code matches a random verification code locally stored in the source terminal.

With reference to the second aspect or the first possible implementation manner of the second aspect, in a second possible implementation manner, the method further includes: if a connection result that includes an error code and is returned by the smartcard and received by the terminal is a connection failure, connecting to an official website of the smartcard by using a network, and querying information corresponding to the error code.

With reference to the second aspect, or the first possible implementation manner of the second aspect, or the second possible implementation manner of the second aspect, in a third possible implementation manner, the verifying, by the source terminal according to the ID of the shared content and the received random verification code, whether the received random verification code matches a locally stored random verification code specifically includes: if the received random verification code matches the random verification code locally stored in the source terminal, executing the step of sending, by the source terminal, a content sending command to a source terminal cloud server; or if the received random verification code does not match the random verification code locally stored in the source terminal, uploading, by the source terminal, the shared content to the source terminal cloud server.

With reference to the second aspect, or the first possible implementation manner of the second aspect, or the second possible implementation manner of the second aspect, or the third possible implementation manner of the second aspect, in a fourth possible implementation manner, the method further includes: sending, by the source terminal, a content sharing request to the destination terminal, and receiving a response of accepting content sharing returned by the destination terminal.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the method further includes: operating, by the destination terminal, the shared content by using the destination terminal cloud server.

According to a third aspect, a content sharing terminal is provided. The terminal includes an interaction unit and a matching unit. The interaction unit sends a request for obtaining an address of a destination terminal cloud server to a destination terminal, and receives the address of the destination terminal cloud server sent by the destination terminal. The interaction unit sends an ID of shared content to a source terminal cloud server, and receives a random verification code that corresponds to the ID of the shared content and is returned by the source terminal cloud server. The matching unit determines, according to the ID of the shared content and the received random verification code, whether the shared content is uploaded to the source terminal cloud server. When determining that the shared content is uploaded to the source terminal cloud server, the matching unit instructs the interaction unit to send a content sending command to the source terminal cloud server. The interaction unit is further configured to send the content sending command to the source terminal cloud server. The content sending command carries the address of the destination terminal cloud server. The address of the destination terminal cloud server is used to make the source terminal cloud server send the shared content to the destination terminal cloud server.

With reference to the third aspect, in a first possible implementation manner, the terminal further includes a memory. The memory is configured to store related information about the shared content, and the related information about the shared content includes the ID of the shared content and a random verification code. The matching unit is further specifically configured to: search the memory for the locally stored random verification code according to the ID of the shared content, compare the locally stored random verification code with the received random verification code returned by the source terminal cloud server, and if the locally stored random verification code is consistent with the random verification code returned by the source terminal cloud server, determine that the shared content is uploaded to the source terminal cloud server, or if the locally stored random verification code is inconsistent with the random verification code returned by the source terminal cloud server, determine that the shared content is not uploaded to the source terminal cloud server.

With reference to the third aspect or the first possible implementation manner of the third aspect, in a second possible implementation manner, the memory stores login information of logging in to a cloud server by a user. The interaction unit logs in to the cloud server according to the login information.

According to a fourth aspect, a content sharing server is provided, where the server includes an interface unit and a processing unit. The interface unit receives a content sending command sent by a terminal, where the content sending command carries an address of a destination terminal cloud server. The processing unit parses the content sending command received by the interface unit, to obtain the address of the destination terminal cloud server, and instructs, according to the address of the destination terminal cloud server, the interaction unit to send a connection establishment request to the destination terminal cloud server. After the interaction unit establishes a connection to the destination terminal cloud server, the processing unit instructs the interaction unit to send shared content to the destination terminal cloud server. The interaction unit sends the connection establishment request to the destination terminal cloud server, establishes the connection to the destination terminal cloud server, and sends the shared content to the destination terminal cloud server.

With reference to the fourth aspect, in a first possible implementation manner, the server further includes a querying unit and a memory. The memory is configured to store related information about shared content. The related information about the shared content includes an ID of the shared content and a random verification code. The interaction unit receives the ID that is of the shared content and sent by the terminal. The querying unit queries the memory according to the received ID of the shared content to obtain the random verification code. The interaction unit sends the random verification code to the terminal.

With reference to the fourth aspect or the first possible implementation manner of the fourth aspect, in a second possible implementation manner, the processing unit records information about a progress and a status that are of transferring the shared content to the destination terminal cloud server by the interaction unit. The interaction unit feeds back, to the terminal, the information about the progress and the status that are of transferring the shared content to the destination terminal cloud server.

According to a fifth aspect, a content sharing system is provided, where the system includes a source terminal, a source terminal cloud server, a destination terminal, and a destination terminal cloud server. The source terminal sends a request for obtaining an address of the destination terminal cloud server to the destination terminal. The destination terminal returns the address of the destination terminal cloud server to the source terminal. The source terminal sends a content sending command to the source terminal cloud server, where the content sending command carries the address of the destination terminal cloud server. The source terminal cloud server sends a connection request to the destination terminal cloud server according to the address of the destination terminal cloud server. The destination terminal cloud server returns, to the source terminal cloud server, a response to the connection request. The source terminal cloud server sends shared content to the destination terminal cloud server after a connection is established.

With reference to the fifth aspect, in a first possible implementation manner, the source terminal determines an ID of the shared content according to locally stored information, and sends the ID of the shared content to the source terminal cloud server. The source terminal cloud server obtains, according to the ID that is of the shared content and sent by the source terminal, a random verification code corresponding to the ID of the shared content, and feeds back the random verification code to the source terminal. The source terminal determines, according to the ID of the shared content and the received random verification code, whether the shared content is uploaded to the source terminal cloud server.

With reference to the fifth aspect or the first possible implementation manner of the fifth aspect, in a second possible implementation manner, the source terminal obtains, according to the ID of the shared content, a random verification code locally stored in the source terminal, performs verification between the random verification code locally stored in the source terminal and the received verification code, and if the locally stored random verification code is consistent with the random verification code returned by the source terminal cloud server, determines that the shared content is uploaded to the source terminal cloud server, or if the locally stored random verification code is inconsistent with the random verification code returned by the source terminal cloud server, determines that the shared content is not uploaded to the source terminal cloud server.

With reference to the fifth aspect, or the first possible implementation manner of the fifth aspect, or the second possible implementation manner of the fifth aspect, in a third possible implementation manner, the destination terminal logs in to the destination terminal cloud server to operate the shared content.

With reference to the fifth aspect, or the first possible implementation manner of the fifth aspect, or the second possible implementation manner of the fifth aspect, or the third possible implementation manner of the fifth aspect, in a fourth possible implementation manner, the system further includes an RCS server, and the source terminal communicates with the destination terminal by using the RCS server.

According to a sixth aspect, a content sharing terminal is provided, where the terminal includes an interaction interface and a processor, and the interaction interface and the processor are connected through a bus. The interaction interface sends a request for obtaining an address of a destination terminal cloud server to a destination terminal, and receives the address of the destination terminal cloud server sent by the destination terminal. The interaction interface sends an ID of shared content to a source terminal cloud server, and receives a random verification code that corresponds to the ID of the shared content and is returned by the source terminal cloud server. When determining, according to the ID of the shared content and the received random verification code, that the shared content is uploaded to the source terminal cloud server, the processor instructs the interaction interface to send a content sending command to the source terminal cloud server. The interaction interface sends the content sending command to the source terminal cloud server, where the content sending command carries the address of the destination terminal cloud server, and the address of the destination terminal cloud server is used to make the source terminal cloud server send the shared content to the destination terminal cloud server.

With reference to the sixth aspect, in a first possible implementation manner, the terminal further includes a memory. The memory is configured to store related information about the shared content, and the related information about the shared content includes the ID of the shared content and a random verification code. The processor searches the memory for a locally stored random verification code according to the ID of the shared content, compares the locally stored random verification code with the received random verification code returned by the source terminal cloud server, and if the locally stored random verification code is consistent with the random verification code returned by the source terminal cloud server, determines that the shared content is uploaded to the source terminal cloud server, or if the locally stored random verification code is inconsistent with the random verification code returned by the source terminal cloud server, determines that the shared content is not uploaded to the source terminal cloud server.

According to a seventh aspect, a content sharing server is provided, where the server includes an interaction interface and a processor, and the interaction interface and the processor are connected through a bus. The interaction interface receives a content sending command sent by a terminal, where the content sending command carries an address of a destination terminal cloud server. The processor parses the content sending command received by the interaction interface, to obtain the address of the destination terminal cloud server, and instructs, according to the address of the destination terminal cloud server, the interaction interface to send a connection establishment request to the destination terminal cloud server. After the interaction interface establishes a connection to the destination terminal cloud server, the processor instructs the interaction interface to send shared content to the destination terminal cloud server. The interaction interface sends the connection establishment request to the destination terminal cloud server and establishes the connection to the destination terminal cloud server, and is further configured to send the shared content to the destination terminal cloud server.

With reference to the seventh aspect, in a first possible implementation manner, the server further includes a memory. The memory is configured to store related information about the shared content, and the related information about the shared content includes an ID of the shared content and a random verification code. The interaction interface receives the ID that is of the shared content and sent by the terminal. The processor queries the memory according to the received ID of the shared content to obtain the random verification code. The interaction interface sends the random verification code to the terminal.

With reference to the seventh aspect or the first possible implementation manner of the seventh aspect, in a second possible implementation manner, the processor records information about a progress and a status that are of transferring the shared content to the destination terminal cloud server by the interaction interface. The interaction interface feeds back, to the terminal, the information about the progress and the status that are of transferring the shared content to the destination terminal cloud server.

In the foregoing solutions provided in the embodiments of the present invention, after a source terminal and a destination terminal respectively log in to their respective cloud servers, verify their respective login information, and log in to their respective cloud servers, shared content may be browsed and operated. When the source terminal sends the shared content to the destination terminal, the source terminal needs only to instruct the source terminal cloud server to send the shared content to the destination terminal cloud server, and mutual verification between the source terminal cloud server and the destination terminal cloud server does not need to be performed. In the embodiments of the present invention, efficiency and a transfer speed of RCS content sharing are enhanced, and security of content sharing is improved.

DETAILED DESCRIPTION OF ILLUSTRATIVE EMBODIMENTS

To resolve a technical problem currently existing in a content sharing process, in the present invention, after shared content is transferred between cloud servers, terminals respectively log in to their respective cloud servers, so that the shared content may be browsed and operated.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
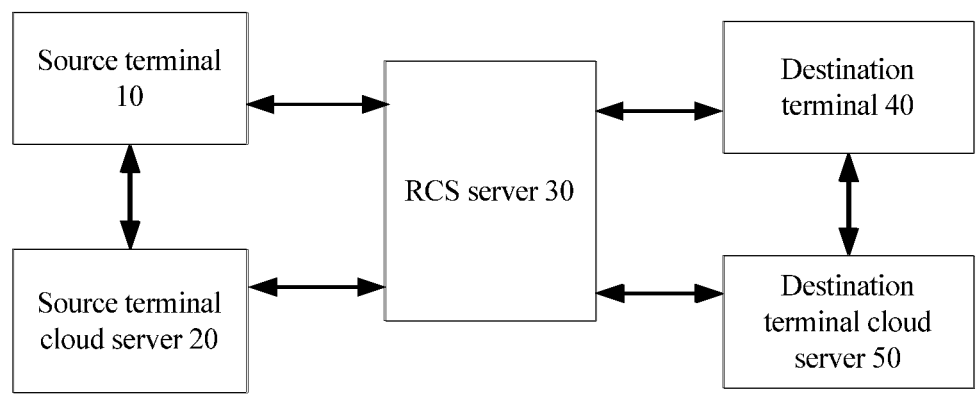
FIG. 1 is a schematic structural diagram of a content sharing system according to an embodiment of the present invention.

Referring to FIG. 1, FIG. 1 shows a content sharing system provided in an embodiment of the present invention. In this embodiment, the content sharing system includes a source terminal 10, a source terminal cloud server 20, an RCS server 30, a destination terminal 40, and a destination terminal cloud server 50. The source terminal 10 may log in to the source terminal cloud server 20 for data interaction, and the destination terminal 40 may log in to the destination terminal cloud server 50 for data interaction. The source terminal 10 obtains an address of the destination terminal cloud server 50 from the destination terminal 40 by using the RCS server 30, and the source terminal 10 sends a content sharing request to the destination terminal 40 by using the RCS server 30. The destination terminal 40 accepts the content sharing request. Therefore, the source terminal 10 instructs the source terminal cloud server 20 to send shared content to the destination terminal cloud server 50, and the destination terminal 40 may log in to the destination terminal cloud server 50 to operate the shared content, so that sharing the shared content from the source terminal cloud server 20 to the destination terminal cloud server 50 is implemented, and a user may conveniently and quickly browse the shared content by using the terminal. On the destination terminal, an operation on the shared content may be: downloading, browsing, or editing. After the destination terminal cloud server receives the shared content, the shared content may be simultaneously downloaded to the destination terminal. In the embodiment of the present invention, the destination terminal cloud server 50 may send, to the destination terminal 40, information such as a downloading progress and a status of downloading the shared content by the destination terminal 40.

In the embodiment of the present invention, the source terminal 10 may further send an address of the source terminal cloud server 20 to the destination terminal 40 by using the RCS server 30, so as to implement that the destination terminal 40 may conveniently and quickly share content to the source terminal 10.

In the embodiment of the present invention, before the source terminal 10 instructs the source terminal cloud server 20 to send the shared content to the destination terminal cloud server 50, the source terminal 10 may further determine an ID of the shared content according to locally stored information, and send the ID of the shared content to the source terminal cloud server 20; the source terminal cloud server 20 obtains a corresponding random verification code according to the ID that is of the shared content and sent by the source terminal 10, and feeds back the random verification code to the source terminal 10. The ID of the shared content may be a number of the shared content or the like. The shared content may be a file.

In the embodiment of the present invention, the source terminal 10 determines, according to the ID of the shared content and the random verification code, whether the shared content is uploaded to the source terminal cloud server. The source terminal 10 searches for a locally stored random verification code according to the ID of the shared content, and compares the locally stored random verification code with the received random verification code returned by the source terminal cloud server 20. If the locally stored random verification code is consistent with the random verification code returned by the source terminal cloud server, it indicates that the shared content is stored in the source terminal cloud server 20; or if the locally stored random verification code is inconsistent with the random verification code returned by the source terminal cloud server, it indicates that the shared content is not uploaded to the source terminal cloud server 20, and the source terminal 10 uploads the shared content to the source terminal cloud server 20. The source terminal server 20 feeds back, to the source terminal 10, information such as a progress and a status of transferring the shared content to the destination terminal cloud server 50 by the source terminal cloud server 20.

In the content sharing system provided in the embodiment of the present invention, content sharing is implemented by means of data interaction between cloud servers of users. Content sharing is performed by using the content sharing system provided in the embodiment of the present invention, so that a user may download, browse, or operate shared content by logging in to a cloud server of the user, thereby enhancing efficiency and a transfer speed of RCS content sharing, and improving security of content sharing.

Figure 11:
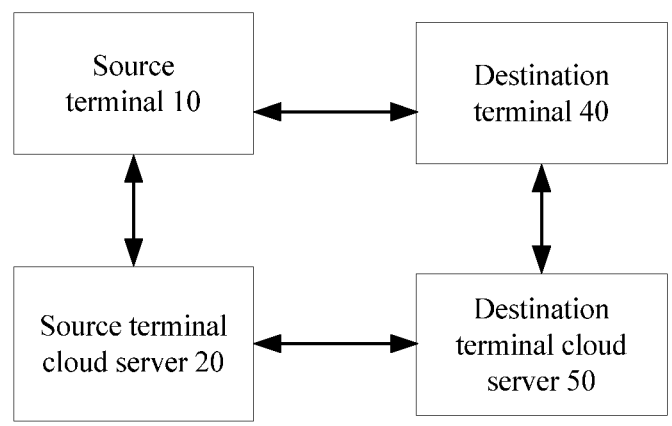
FIG. 11 is a schematic structural diagram of a content sharing system according to an embodiment of the present invention.

In a content sharing system provided in another embodiment of the present invention, in an interaction process of terminals, the RCS server 30 may not be needed, that is, the source terminal 10 and the destination terminal 40 may directly exchange information. In a content sharing system shown in FIG. 11, content sharing may still be implemented without using an RCS server. In the content sharing system shown in FIG. 11, a source terminal 10, a source terminal cloud server 20, a destination terminal 40, and a destination terminal cloud server 50 may mutually exchange information and exchange data, so as to implement content sharing. The terminals directly exchange data with their respective cloud servers, thereby enhancing efficiency of content sharing, and improving security of the content sharing.

Figure 2A:
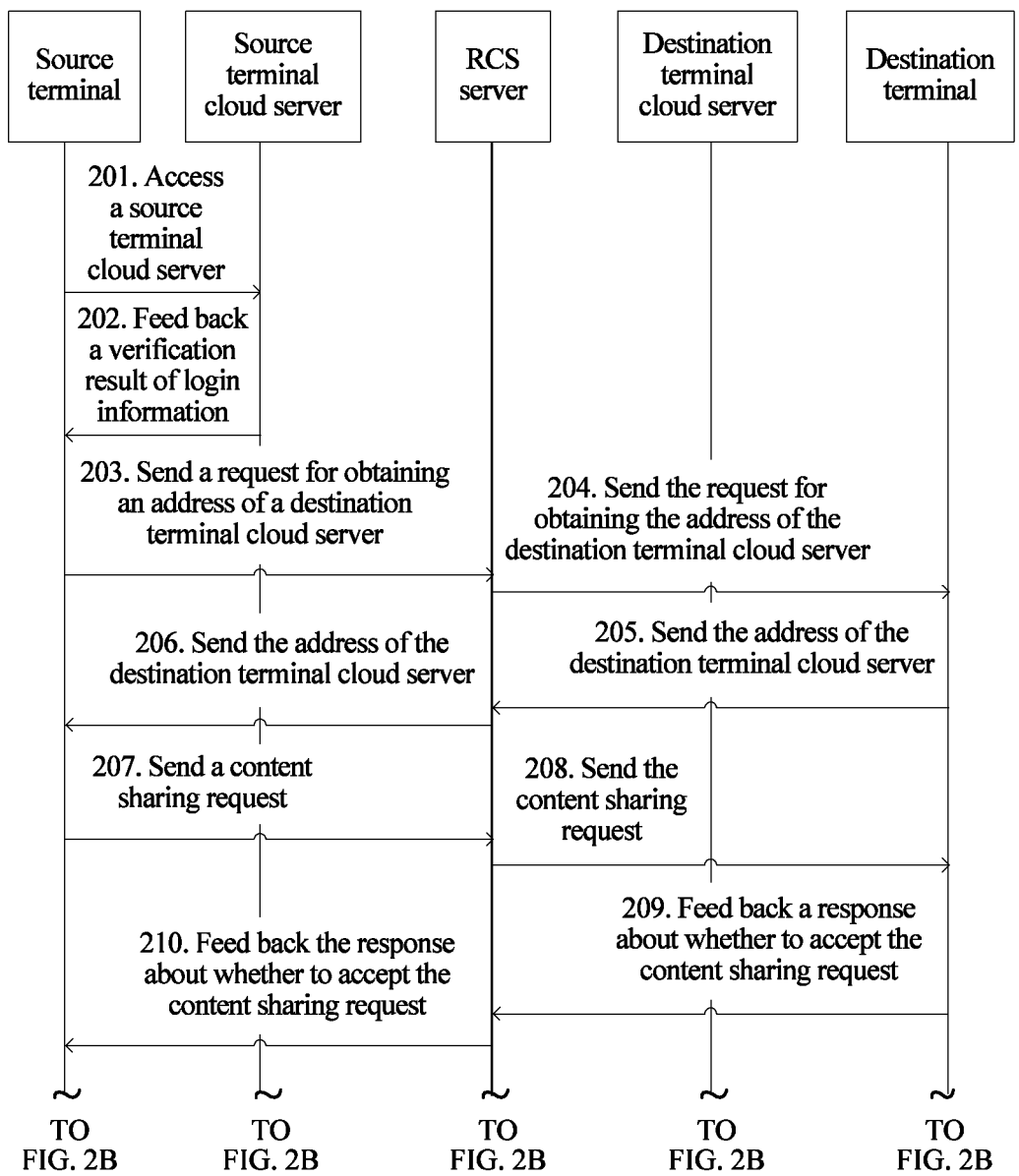
FIG. 2A and FIG. 2B are a signaling flowchart of a content sharing method according to an embodiment of the present invention.
Figure 2B:
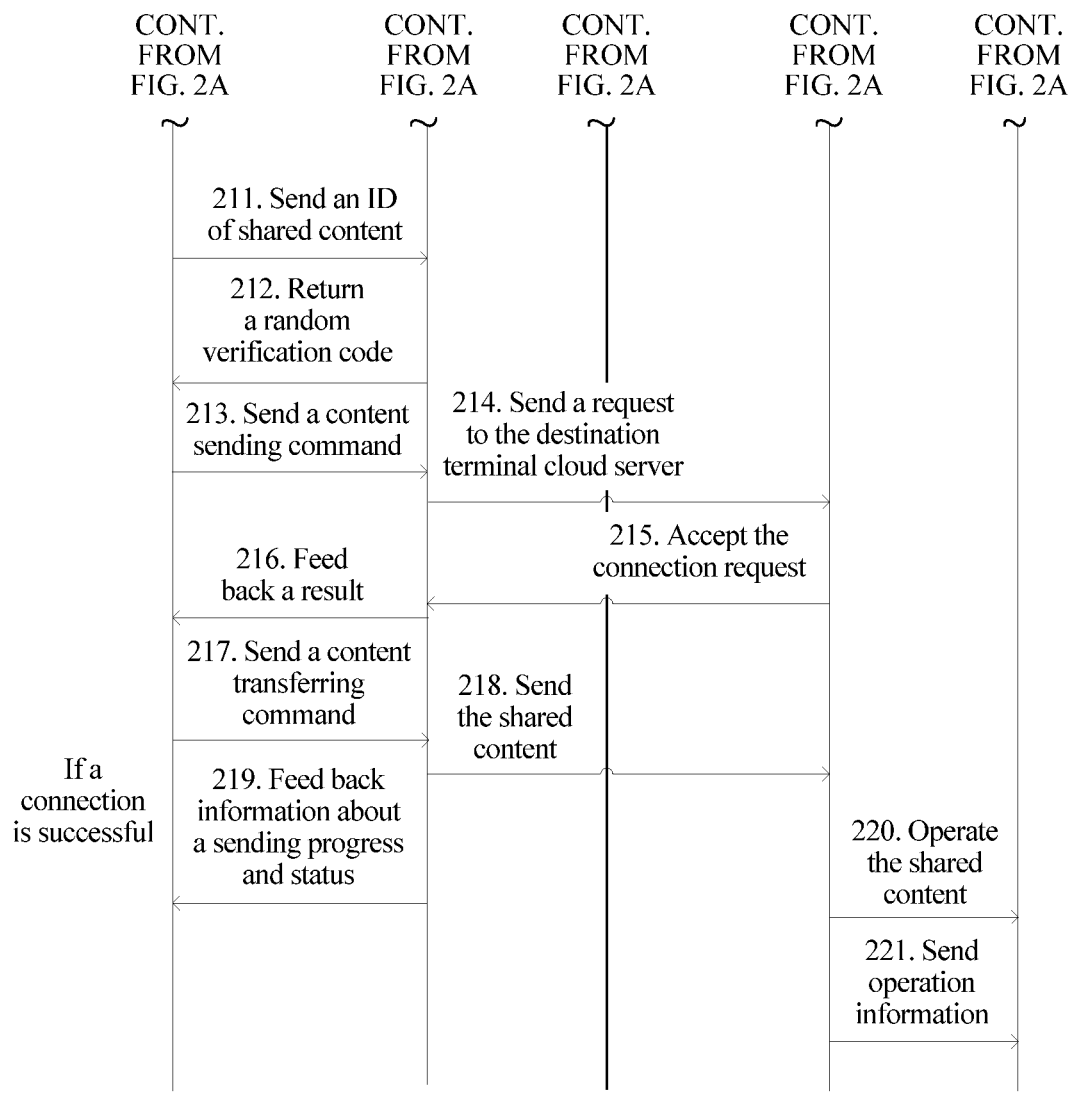

As shown in FIG. 2A and FIG. 2B, FIG. 2A and FIG. 2B show a signaling flowchart of a content sharing method provided in an embodiment of the present invention. This embodiment is applied to a content sharing system that includes a source terminal, a source terminal cloud server, an RCS server, a destination terminal, and a destination terminal cloud server. As shown in FIG. 2A and FIG. 2B, the signaling flowchart shows a process of signaling interaction between the terminals and the servers. The following describes the signaling interaction process in detail.

Step 201: The source terminal accesses the source terminal cloud server, and sends verification information of the source terminal to the source terminal cloud server, to request to access the source terminal cloud server.

In the embodiment of the present invention, the source terminal may perform, by using an SDK module in the source terminal, encryption on the verification information, such as an account password entered by a user, and send the encrypted verification information to the source terminal cloud server to perform login verification.

Step 202: After the source terminal cloud server performs verification on the verification information, if the verification is successful, login is successful, or if the verification fails, login fails. The source terminal cloud server feeds back a login result of the source terminal to the source terminal.

Step 203: The source terminal sends a request for obtaining an address of the destination terminal cloud server to the RCS server.

In the embodiment of the present invention, an address of the source terminal cloud server may be carried in the request for obtaining the address of the destination terminal cloud server sent by the source terminal, and the address of the source terminal cloud server is sent to the RCS server.

Step 204: The RCS server sends the request for obtaining the address of the destination terminal cloud server to the destination terminal.

In the embodiment of the present invention, when the request for obtaining the address of the destination terminal cloud server that is sent by the source terminal and received by the RCS server carries the address of the source terminal cloud server, the RCS server records the address, and adds the address of the source terminal cloud server into the request for obtaining the address of the destination terminal cloud server sent to the destination terminal.

Step 205 and step 206: The destination terminal sends the address of the destination terminal cloud server to the source terminal by using the RCS server.

Step 207: The source terminal sends a content sharing request to the RCS server.

In the embodiment of the present invention, a user may send the content sharing request to the RCS server by using the source terminal, where the content sharing request may include information about a file name, a type, a size, a thumbnail, and the like. The source terminal may send the content sharing request to the RCS server by using a SendFileRequest message, and the RCS server performs validity and security monitoring on to-be-shared content, and may further monitor whether a timeout occurs, or the like.

Step 208: The RCS server sends the content sharing request to the destination terminal.

Step 209: The destination terminal feeds back, to the RCS server, a response about whether to accept the content sharing request.

In the embodiment of the present invention, a user may choose to accept or reject the content sharing request by using the destination terminal, and the destination terminal feeds back, to the RCS server, the response of accepting or rejecting the content sharing request according to a selection result of the user.

Step 210: The RCS server returns, to the source terminal, the response that is about whether to accept the content sharing request and fed back by the destination terminal.

Step 211: The source terminal sends an ID of shared content to the source terminal cloud server.

In the embodiment of the present invention, the source terminal determines the ID of the shared content according to locally stored information, and sends the ID of the shared content to the source terminal cloud server. The ID of the shared content may be a number of the shared content or the like. The shared content may be a file.

Step 212: The source terminal cloud server obtains a corresponding random verification code according to the ID that is of the shared content and sent by the source terminal, and feeds back the ID of the shared content and the random verification code to the source terminal.

In the embodiment of the present invention, the source terminal determines, according to the ID of the shared content and the random verification code, whether the shared content is uploaded to the source terminal cloud server. The source terminal searches for a locally stored random verification code according to the ID of the shared content, and compares the locally stored random verification code with the received random verification code returned by the source terminal cloud server. If the locally stored random verification code is consistent with the random verification code returned by the source terminal cloud server, it indicates that the shared content is stored in the source terminal cloud server; or if the locally stored random verification code is inconsistent with the random verification code returned by the source terminal cloud server, it indicates that the shared content is not uploaded to the source terminal cloud server, and the source terminal uploads the shared content to the source terminal cloud server. When determining that the shared content is stored in the source terminal cloud server, the source terminal sends a content sending command to the source terminal cloud server.

In the embodiment of the present invention, the source terminal may add a setting of logging in to a cloud server into a submenu "account" in a local "setting" menu. When a user logs in to the cloud server, the user is prompted to select "Automatically upload content to the cloud server when WIFI is enabled", so that content that needs to be shared may be uploaded to and stored in the cloud server in advance.

In the present invention, the source terminal may maintain locally stored information about shared content by using Table 1.

TABLE 1

| Number | Random verification code | File path | Sharing mark |
|---|---|---|---|
| 001 | Aaa123 | /.../ | Yes |
| 002 | Bbb123 | /.../ | No |
| ... | | | |

In Table 1, the number may indicate a number or an ID of shared content. The number may be automatically generated when the shared content is uploaded to the source terminal cloud server. The random verification code is a verification code that is used to verify whether there is a one-to-one correspondence between shared content in the source terminal cloud server and local shared content in the source terminal. The random verification code may be randomly generated by the source terminal when the shared content is uploaded to the source terminal cloud server. The random verification code may include a digit and/or Pinyin. The file path is used to indicate an absolute path for storing the shared content by the source terminal. The file path is unique in a same terminal. The sharing flag is used to indicate whether the shared content is uploaded to the source terminal cloud server. If the shared content is uploaded, the sharing flag may be marked as yes, or if the shared content is not uploaded, the sharing flag may be marked as no.

In the present invention, the source terminal cloud server may maintain locally stored information about shared content by using Table 2.

TABLE 2

| Number | Random verification code | File path |
|---|---|---|
| 001 | Aaa123 | /.../ |
| 002 | Abc123 | /.../ |
| ... | | |

In Table 2, the number is carried when the source terminal uploads the shared content to the source terminal cloud server. The random verification code is carried when the source terminal uploads the shared content to the source terminal cloud server. The file path is used to indicate a path in which the shared content is stored in the source terminal cloud server.

In the embodiments of present invention, verification of a correspondence between the shared content in the source terminal and the content stored in the source terminal cloud server may be determined with reference to Table 1 and Table 2. For example, when content is being shared, the source terminal queries Table 1 according to a file path of the shared content, and obtains a number 001 of the shared content. The source terminal sends the found number 001 of the shared content to the source terminal cloud server. The source terminal cloud server searches Table 2 according to the received number 001 of the shared content, and obtains a corresponding random verification code Aaa123. The source terminal cloud server returns the number 001 and the random verification code Aaa123 that is found according to the number to the source terminal. The source terminal queries Table 1 according to the received number 001, and obtains a random verification code Aaa123. The source terminal compares the random verification code obtained by query with the received random verification code. The verification codes are consistent, and therefore it may be determined that the shared content is uploaded to the source terminal cloud server. It may be learned from Table 1 and Table 2 that, the random verification codes corresponding to the number 001 match each other, and therefore it is determined that the shared content with the number 001 is uploaded to the source terminal cloud server. The source terminal may mark a sharing flag corresponding to the shared content with the number 001 in Table 1 as "yes". Random verification codes corresponding to a number 002 do not match, and therefore it is determined that shared content with the number 002 is not uploaded to the source terminal cloud server. The source terminal may mark a sharing flag corresponding to the shared content with the number 002 in Table 1 as "no".

Step 213: When the source terminal determines that the shared content is stored in the source terminal cloud server, the source terminal sends a content sending command to the source terminal cloud server. The content sending command is used to instruct the source terminal cloud server to send the shared content to the destination terminal cloud server. The address of the destination terminal cloud server may be carried in the content sending command.

Step 214: The source terminal cloud server sends a connection request to the destination terminal cloud server, so as to implement that content transferring can be performed between the source terminal cloud server and the destination terminal cloud server.

In the embodiment of the present invention, a transmission mode of the shared content may be determined according to a status of a connection between the source terminal cloud server and the destination terminal cloud server. If the connection between the source terminal cloud server and the destination terminal cloud server is successful, the shared content may be directly sent from the source terminal cloud server to the destination terminal cloud server; or if the connection between the source terminal cloud server and the destination terminal cloud server fails, the shared content may be transferred by using the RCS server.

Step 215: The destination terminal cloud server returns, to the source terminal cloud server, a response to the connection request.

The response includes a feedback result of the connection request. The feedback result may be accepting the connection request and establishing a connection. Alternatively, the feedback result may be rejecting the connection request, and the process ends.

Step 216: The source terminal cloud server sends a feedback result to the source terminal.

Step 217: The source terminal sends a content transferring command to the source terminal cloud server.

Step 218: The source terminal cloud server sends the shared content to the destination terminal cloud server.

The source terminal cloud server sends the shared content to the destination terminal cloud server. Communication between the source terminal cloud server and the destination terminal cloud server may be implemented by using an agreed specific protocol. For example, the communication between the source terminal cloud server and the destination terminal cloud server may be implemented by using the SMTP (Simple Mail Transfer Protocol).

Step 219: The source terminal server feeds back, to the source terminal, information such as a progress and a status of transferring the shared content by the source terminal cloud server.

Step 220: The destination terminal logs in to the destination terminal cloud server to operate the shared content.

On the destination terminal, an operation on the shared content may be: downloading, browsing, or editing. After the destination terminal cloud server receives the shared content, the shared content may be simultaneously downloaded to the destination terminal.

During initialization, a related operation such as login verification or security verification is performed between the destination terminal and the destination terminal cloud server, and may not need to be operated again when the shared content is downloaded or browsed, thereby enhancing a speed and security of content sharing.

Step 221: The destination terminal cloud server sends operation information of the shared content to the destination terminal.

The operation information may include information such as a progress and a status of downloading the shared content. That is, the destination terminal cloud server may send, to the destination terminal, the information such as the progress and the status of downloading the shared content.

In the embodiment of the present invention, data interaction is performed between cloud servers of users, so that content sharing may be conveniently and quickly performed. For a photo, a video, or another file that is stored in a cloud server, the photo, the video, or the another file in the server may be sent to a cloud server of another user according to a sharing instruction of a user, and the another user may download the photo, the video, or the another file from the cloud server by using a terminal, so as to implement content sharing between users. In the embodiment of the present invention, time of content sharing may be greatly reduced, and user experience may be enhanced.

After a source terminal and a destination terminal respectively log in to their respective cloud servers, verify their respective login information, and log in to their respective cloud servers, shared content may be browsed and operated. When the source terminal sends the shared content to the destination terminal, the source terminal needs only to instruct the source terminal cloud server to send the shared content to the destination terminal cloud server, and mutual verification does not need to be performed between the source terminal cloud server and the destination terminal cloud server. In the embodiment of the present invention, efficiency and a transfer speed of RCS content sharing are enhanced, and security of content sharing is improved.

Figure 3:
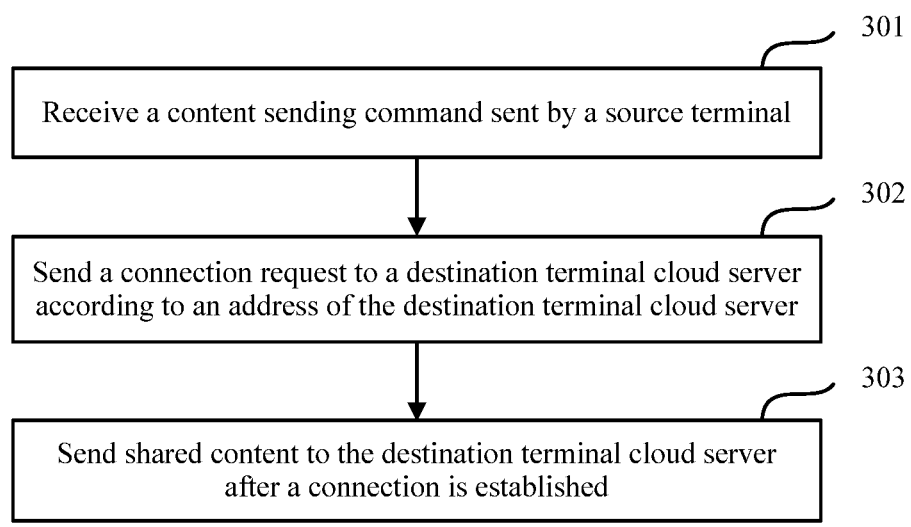
FIG. 3 is a flowchart of a content sharing method according to an embodiment of the present invention.

An embodiment of the present invention further provides a content sharing method. Referring to FIG. 3, FIG. 3 shows a flowchart of a content sharing method. The content sharing method may be applied to a server. The server may be a cloud server of a source terminal. The source terminal may log in to the cloud server. The following describes a process of the content sharing method in detail.

Step 301: Receive a content sending command sent by the source terminal. The content sending command carries an address of a destination terminal cloud server. The content sending command is used to instruct to send shared content to the destination terminal cloud server.

Step 302: Send a connection request to the destination terminal cloud server according to the address of the destination terminal cloud server. The connection request is used to request to establish a connection to the destination terminal cloud server.

Step 303: Send the shared content to the destination terminal cloud server after the connection is established.

Figure 4:
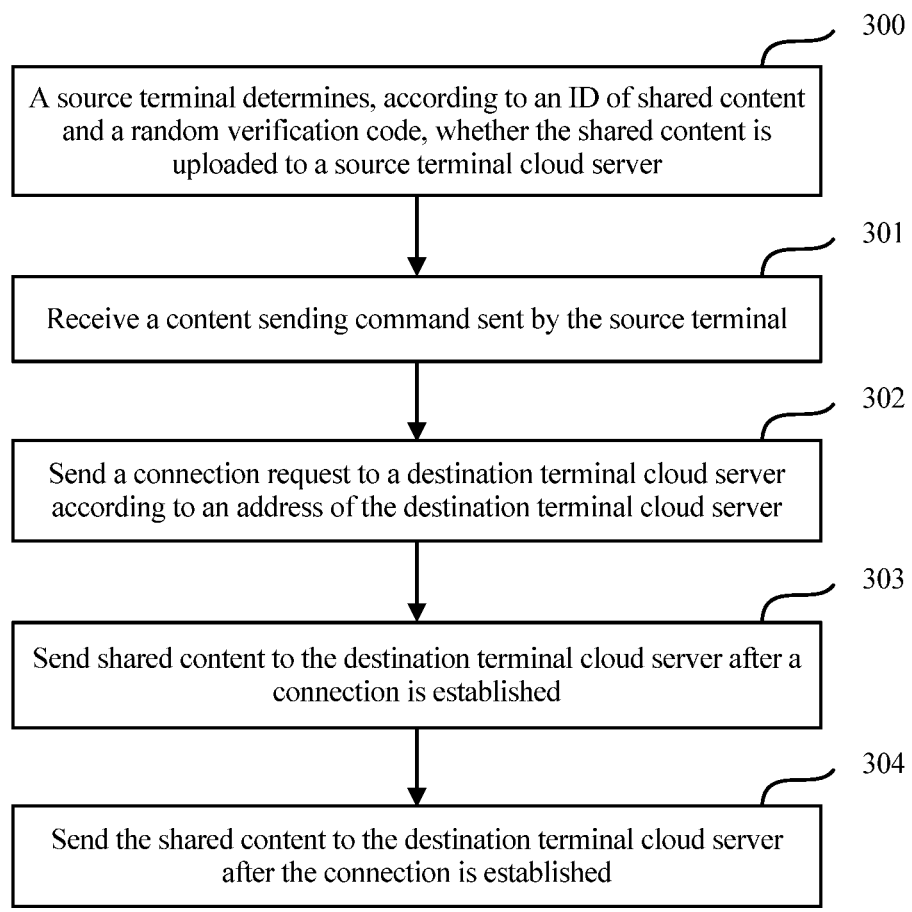
FIG. 4 is a flowchart of a content sharing method according to an embodiment of the present invention.

In the embodiment of the present invention, referring to FIG. 4, after step 303, the method may further include:

Step 304: The destination terminal operates the shared content by using the destination terminal cloud server.

In the embodiment of the present invention, on the destination terminal, an operation on the shared content may be: downloading, browsing, or editing. After step 304, the method may further include a step: The destination terminal cloud server sends operation information of the shared content to the destination terminal. The operation information includes information such as a downloading progress and a status.

In the embodiment of the present invention, referring to FIG. 4, before step 301, the method may further include the following.

Step 300: The source terminal determines, according to an ID of shared content and a random verification code, whether the shared content is uploaded to a source terminal cloud server.

The source terminal searches for a locally stored random verification code according to the ID of the shared content, and compares the locally stored random verification code with a received random verification code returned by the source terminal cloud server. If the locally stored random verification code is consistent with the random verification code returned by the source terminal cloud server, it indicates that the shared content is stored in the source terminal cloud server; or if the locally stored random verification code is inconsistent with the random verification code returned by the source terminal cloud server, it indicates that the shared content is not uploaded to the source terminal cloud server, and the source terminal uploads the shared content to the source terminal cloud server.

Before the step of determining, by the source terminal, according to an ID of shared content and a random verification code, whether the shared content is uploaded to a source terminal cloud server, the method may further include: determining, by the source terminal, the ID of the shared content according to locally stored information, and sending the ID of the shared content to the source terminal cloud server; and obtaining, by the source terminal cloud server, a corresponding random verification code according to the ID that is of the shared content and sent by the source terminal, and feeding back the ID of the shared content and the random verification code to the source terminal.

In the embodiment of the present invention, before step 301, the method may further include a step: The source terminal sends a request for obtaining the address of the destination terminal cloud server to an RCS server, and the destination terminal sends the address of the destination terminal cloud server to the source terminal by using the RCS server. In the embodiment of the present invention, the source terminal may directly interact with the destination terminal, or may interact with the destination terminal by using the RCS server.

In the embodiment of the present invention, the RCS server may be configured to implement information exchange between the source terminal and the destination terminal.

In the embodiment of the present invention, after step 303, the method may further include a step: The source terminal server feeds back, to the source terminal, information such as a progress and a status of transferring the shared content to the destination terminal cloud server by the source terminal cloud server.

In the foregoing embodiment of the present invention, after shared content is transferred between cloud servers, and after a source terminal and a destination terminal respectively log in to their respective cloud servers, verify their respective login information, and log in to their respective cloud servers, the shared content may be browsed and operated. In the embodiment of the present invention, efficiency and a transfer speed of RCS content sharing are enhanced, and security of content sharing is improved.

Figure 5:
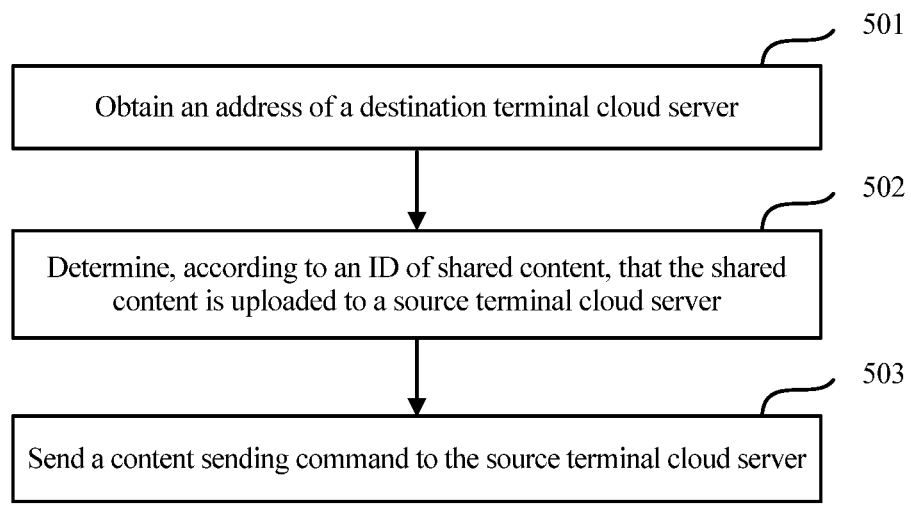
FIG. 5 is a flowchart of a content sharing method according to an embodiment of the present invention.

An embodiment of the present invention further provides a content sharing method. Referring to FIG. 5, FIG. 5 shows a flowchart of a content sharing method. The content sharing method may be applied to a terminal. The content sharing method is used in a terminal that shares content to another user or terminal. A terminal mentioned in the present invention may be but is not limited to a mobile terminal, a fixed terminal, a mobile phone, a PAD, or the like. The following describes a process of the content sharing method in detail.

Step 501: Obtain an address of a destination terminal cloud server.

In the embodiment of the present invention, a terminal may send a request for obtaining the address of the destination terminal cloud server to a destination terminal by using an RCS server, and the destination terminal sends the address of the destination terminal cloud server to the source terminal by using the RCS server.

Step 502: Determine, according to an ID of shared content, that the shared content is uploaded to a source terminal cloud server.

Step 503: Send a content sending command to the source terminal cloud server. The content sending command carries the address of the destination terminal cloud server. The content sending command is used to instruct to send the shared content to the destination terminal cloud server, so that an operation is performed on the shared content on the destination terminal by using the destination terminal cloud server. On the destination terminal, an operation on the shared content may be: downloading, browsing, or editing.

In the embodiment of the present invention, after step 503, the method may further include a step: The source terminal server feeds back, to the source terminal, information such as a progress and a status of transferring the shared content to the destination terminal cloud server by the source terminal cloud server.

In the embodiments of the present invention, step 502 specifically includes: determining, by the source terminal, the ID of the shared content according to locally stored information, and sending the ID of the shared content to the source terminal cloud server; obtaining, by the source terminal cloud server, a corresponding random verification code according to the ID that is of the shared content and sent by the source terminal, and feeding back the ID of the shared content and the random verification code to the source terminal; determining, by the source terminal according to the ID of the shared content and the random verification code, whether the shared content is uploaded to the source terminal cloud server; and searching, by the source terminal, for a locally stored random verification code according to the ID of the shared content, and comparing the locally stored random verification code with the received random verification code returned by the source terminal cloud server, where if the locally stored random verification code is consistent with the random verification code returned by the source terminal cloud server, it indicates that the shared content is stored in the source terminal cloud server; or if the locally stored random verification code is inconsistent with the random verification code returned by the source terminal cloud server, it indicates that the shared content is not uploaded to the source terminal cloud server, and the source terminal uploads the shared content to the source terminal cloud server.

In the embodiment of the present invention, for a specific process in which the terminal determines, according to the ID of the shared content, whether the shared content is uploaded to the source terminal cloud server, refer to a determining process with reference to Table 1 and Table 2 in the foregoing embodiment. The ID of the shared content may be a number or an identifier of the shared content, or the like.

In the foregoing embodiment of the present invention, whether shared content is uploaded to a cloud server is determined by using a terminal; in addition, after the shared content is transferred between cloud servers, and after a source terminal and a destination terminal respectively log in to their respective cloud servers, verify their respective login information, and log in to their respective cloud servers, the shared content may be browsed and operated. In the content sharing method provided in the embodiment of the present invention, efficiency and a transfer speed of RCS content sharing are enhanced, and convenience, quickness, and security of content sharing are improved.

Figure 6:
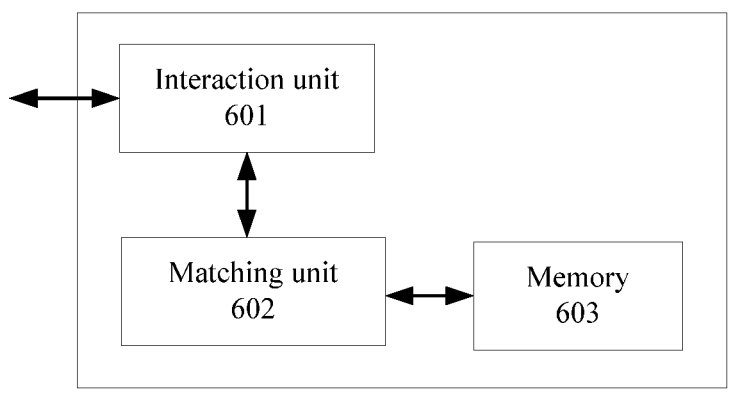
FIG. 6 is a schematic structural diagram of a content sharing terminal according to an embodiment of the present invention.

An embodiment of the present invention further provides a terminal for content sharing. Referring to FIG. 6, FIG. 6 shows a schematic structural diagram of a terminal. The terminal includes an interaction unit 601 and a matching unit 602. The interaction unit 601 is configured to interact with a source terminal server, and is further configured to interact with an RCS server. The interaction unit 601 may be configured to access the source terminal cloud server, and send verification information of a source terminal to the source terminal cloud server, to request to access the source terminal cloud server. The interaction unit 601 is further configured to send a request for obtaining an address of a destination terminal cloud server to a destination terminal, and receive the address of the destination terminal cloud server sent by the destination terminal. The interaction unit 601 is further configured to send a content sharing request to the destination terminal, and receive a response about whether the destination terminal accepts the content sharing request. The interaction unit 601 is further configured to send an ID of shared content to the source terminal cloud server, and receive the ID of the shared content and a random verification code that are returned by the source terminal cloud server. Interaction between the interaction unit 601 and the destination terminal may be implemented by using the RCS server.

The matching unit 602 is configured to determine, according to the ID of the shared content and the random verification code that are returned by the source terminal cloud server, whether the shared content is uploaded to the source terminal cloud server.

The terminal further includes a memory 603. The memory 603 is configured to store related information about the shared content. The related information about the shared content is information shown in Table 1.

In the embodiment of the present invention, referring to Table 1 and Table 2, the matching unit 602 searches the memory 603 for a locally stored random verification code according to the ID of the shared content, compares the locally stored random verification code with the received random verification code returned by the source terminal cloud server, and if the locally stored random verification code is consistent with the random verification code returned by the source terminal cloud server, determines that the shared content is uploaded to the source terminal cloud server, or if the locally stored random verification code is inconsistent with the random verification code returned by the source terminal cloud server, determines that the shared content is not uploaded to the source terminal cloud server.

When the matching unit 602 determines that the shared content is uploaded to the source terminal cloud server, the interaction unit 601 sends a content sending command to the source terminal cloud server. The content sending command is used to instruct the source terminal cloud server to send the shared content to the destination terminal cloud server. The address of the destination terminal cloud server may be carried in the content sending command. The interaction unit 601 is further configured to receive information such as a progress and a status of transferring the shared content that are fed back by the source terminal cloud server.

The memory 603 is further configured to store login information of logging in to a cloud server by a user, and the interaction unit 601 is configured to log in to the cloud server according to the login information.

In the embodiment of the present invention, the interaction unit 601 may be an SDK module. The SDK module may implement interaction between the terminal and another terminal or a server.

According to the terminal provided in the embodiment of the present invention, whether shared content is uploaded to a cloud server is determined; in addition, after the shared content is transferred between cloud servers, and after a source terminal and a destination terminal respectively log in to their respective cloud servers, verify their respective login information, and log in to their respective cloud servers, the shared content may be browsed and operated. In a content sharing method provided in an embodiment of the present invention, efficiency and a transfer speed of RCS content sharing are enhanced, and convenience, quickness, and security of content sharing are improved.

Figure 7:
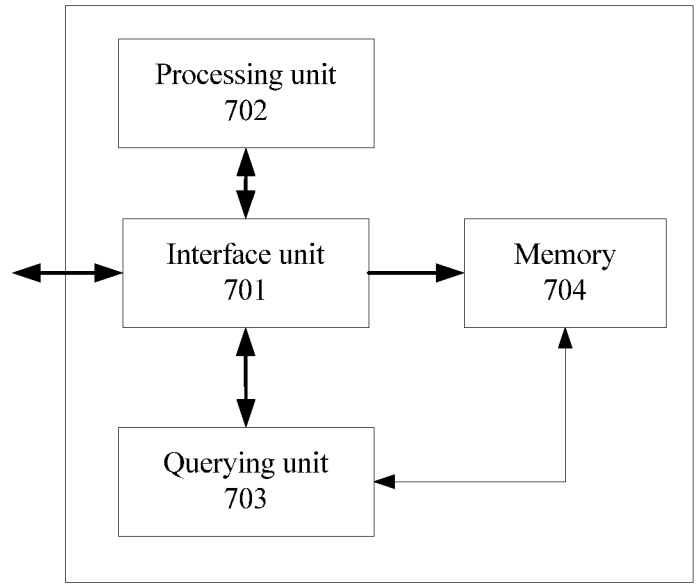
FIG. 7 is a schematic structural diagram of a content sharing server according to an embodiment of the present invention.

An embodiment of the present invention further provides a content sharing server. Referring to FIG. 7, FIG. 7 shows a schematic structural diagram of a server. The server includes an interface unit 701, a processing unit 702, a querying unit 703, and a memory 704. The interface unit 701 is configured to interact with a terminal, and is further configured to interact with a server. The interface unit 701 receives a content sending command sent by the terminal.

The content sending command carries an address of a destination terminal cloud server. The content sending command is used to instruct to send shared content to the destination terminal cloud server. The processing unit 702 parses the content sending command according to the content sending command received by the interface unit 701, to obtain the address of the destination terminal cloud server, and instructs, according to the address of the destination terminal cloud server, the interaction unit 701 to send a connection establishment request to the destination terminal cloud server. The interaction unit 701 sends the connection establishment request to the destination terminal cloud server and establishes a connection to the destination terminal cloud server. After the interaction unit 701 establishes the connection to the destination terminal cloud server, the processing unit 702 instructs the interaction unit 701 to send the shared content to the destination terminal cloud server.

In the embodiment of the present invention, the memory 704 is configured to store related information about the shared content. The related information about the shared content includes but is not limited to: a number of the shared content, a random verification code, and a file path. The number of the shared content and the random verification code may be received by the interaction unit 701 from the terminal. The file path is a specific path in which the shared content is stored.

The interaction unit 701 receives an ID that is of the shared content and sent by the terminal. The querying unit 703 queries the memory 704 according to the received ID of the shared content to obtain the random verification code. The interaction unit 701 sends the ID of the shared content and the random verification code to the terminal. The terminal may determine, according to the ID of the shared content and the random verification code, whether the shared content is uploaded to the server.

In the embodiment of the present invention, the processing unit 702 is further configured to record information such as a progress and a status of transferring the shared content to the destination terminal cloud server by the interaction unit 701. The interaction unit 701 is further configured to feed back, to the terminal, the information such as the progress and the status of transferring the shared content to the destination terminal cloud server.

In the foregoing embodiment of the present invention, a server interacts with a terminal and another cloud server by using an interaction unit; after shared content is transferred between cloud servers, and after a source terminal and a destination terminal respectively log in to their respective cloud servers, verify their respective login information, and log in to their respective cloud servers, the shared content may be browsed and operated. In the embodiment of the present invention, efficiency and a transfer speed of RCS content sharing are enhanced, and security of content sharing is improved.

Figure 8:
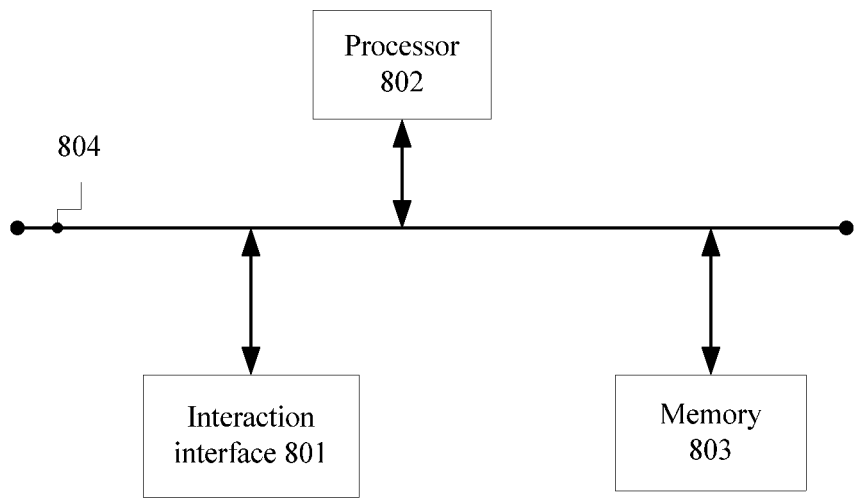
FIG. 8 is a schematic structural diagram of a terminal for content sharing according to an embodiment of the present invention.

An embodiment of the present invention further provides a content sharing terminal. Referring to FIG. 8, FIG. 8 shows a schematic structural diagram of a terminal. The terminal includes an interaction interface 801, a processor 802, and a memory 803. The interaction interface 801, the processor 802, and the memory 803 are connected through a bus 804. The interaction interface 801 is configured to interact with a source terminal server, and is further configured to interact with an RCS server. The interaction interface 801 may be configured to access the source terminal cloud server, and send verification information of a source terminal to the source terminal cloud server, to request to access the source terminal cloud server. The interaction interface 801 is further configured to send a request for obtaining an address of a destination terminal cloud server to a destination terminal, and receive the address of the destination terminal cloud server sent by the destination terminal. The interaction interface 801 is further configured to send a content sharing request to the destination terminal, and receive a response, returned by the destination terminal, about whether to accept the content sharing request. The interaction interface 801 is further configured to send an ID of shared content to the source terminal cloud server, and receive the ID of the shared content and a random verification code that are returned by the source terminal cloud server.

The interaction interface 801 may further send the request for obtaining the address of the destination terminal cloud server to the RCS server, and receive the address of the destination terminal cloud server sent by the destination terminal by using the RCS server.

The processor 802 is configured to determine, according to the ID of the shared content and the random verification code that are returned by the source terminal cloud server, whether the shared content is uploaded to the source terminal cloud server.

The memory 803 is configured to store related information about the shared content. The related information about the shared content is information shown in Table 1.

In the embodiment of the present invention, referring to Table 1 and Table 2, the processor 802 searches the memory 803 for a locally stored random verification code according to the ID of the shared content, compares the locally stored random verification code with the received random verification code returned by the source terminal cloud server, and if the locally stored random verification code is consistent with the random verification code returned by the source terminal cloud server, determines that the shared content is uploaded to the source terminal cloud server, or if the locally stored random verification code is inconsistent with the random verification code returned by the source terminal cloud server, determines that the shared content is not uploaded to the source terminal cloud server.

When determining that the shared content is uploaded to the source terminal cloud server, the processor 802 instructs the interaction interface 801 to send a content sending command to the source terminal cloud server. The content sending command is used to instruct the source terminal cloud server to send the shared content to the destination terminal cloud server. The address of the destination terminal cloud server may be carried in the content sending command. The interaction interface 801 is further configured to receive information such as a progress and a status of transferring the shared content that are fed back by the source terminal cloud server.

In the embodiment of the present invention, the interaction interface 801 may be an SDK module. The SDK module may implement interaction between the terminal and another terminal or a server.

According to the terminal provided in the embodiment of the present invention, whether shared content is uploaded to a cloud server is determined; in addition, after the shared content is transferred between cloud servers, and after a source terminal and a destination terminal respectively log in to their respective cloud servers, verify their respective login information, and log in to their respective cloud servers, the shared content may be browsed and operated. In a content sharing method provided in an embodiment of the present invention, efficiency and a transfer speed of RCS content sharing are enhanced, and convenience, quickness, and security of content sharing are improved.

Figure 9:
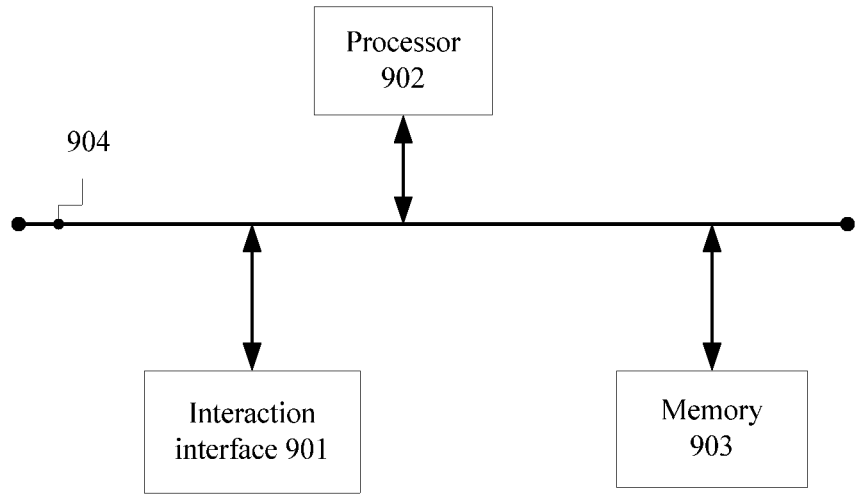
FIG. 9 is a schematic structural diagram of a server for content sharing according to an embodiment of the present invention.

An embodiment of the present invention further provides a content sharing server. Referring to FIG. 9, FIG. 9 shows a schematic structural diagram of a server. The server includes an interaction interface 901, a processor 902, and a memory 903. The interaction interface 901, the processor 902, and the memory 903 are connected through a bus 904. The interaction interface 901 is configured to interact with a terminal, and is further configured to interact with a server. The interaction interface 901 receives a content sending command sent by the terminal. The content sending command carries an address of a destination terminal cloud server. The content sending command is used to instruct to send shared content to the destination terminal cloud server. The processor 902 parses the content sending command according to the content sending command received by the interaction interface 901, to obtain the address of the destination terminal cloud server, and instructs, according to the address of the destination terminal cloud server, the interaction interface 901 to send a connection establishment request to the destination terminal cloud server. The interaction interface 901 sends the connection establishment request to the destination terminal cloud server and establishes a connection to the destination terminal cloud server. After the interaction interface 901 establishes the connection to the destination terminal cloud server, the processor 902 instructs the interaction interface 901 to send the shared content to the destination terminal cloud server.

In the embodiment of the present invention, the memory 903 is configured to store related information about the shared content. The related information about the shared content includes but is not limited to: a number of the shared content, a random verification code, and a file path. The number of the shared content and the random verification code may be received by the interaction interface 901 and sent by the terminal. The file path is a specific path in which the shared content is stored.

The interaction interface 901 receives an ID that is of the shared content and sent by the terminal. The processor 902 queries the memory 903 according to the received ID of the shared content to obtain the random verification code. The interaction interface 901 sends the ID of the shared content and the random verification code to the terminal. The terminal may determine, according to the ID of the shared content and the random verification code, whether the shared content is uploaded to the server.

In the embodiment of the present invention, the processor 902 is further configured to record information such as a progress and a status of transferring the shared content to the destination terminal cloud server by the interaction interface 901. The interaction interface 901 is further configured to feed back, to the terminal, the information such as the progress and the status of transferring the shared content to the destination terminal cloud server.

In the foregoing embodiment of the present invention, a server interacts with a terminal and another cloud server by using an interaction interface; after shared content is transferred between cloud servers, and after a source terminal and a destination terminal respectively log in to their respective cloud servers, verify their respective login information, and log in to their respective cloud servers, the shared content may be browsed and operated. In the embodiment of the present invention, efficiency and a transfer speed of RCS content sharing are enhanced, and security of content sharing is improved.

Figure 10:
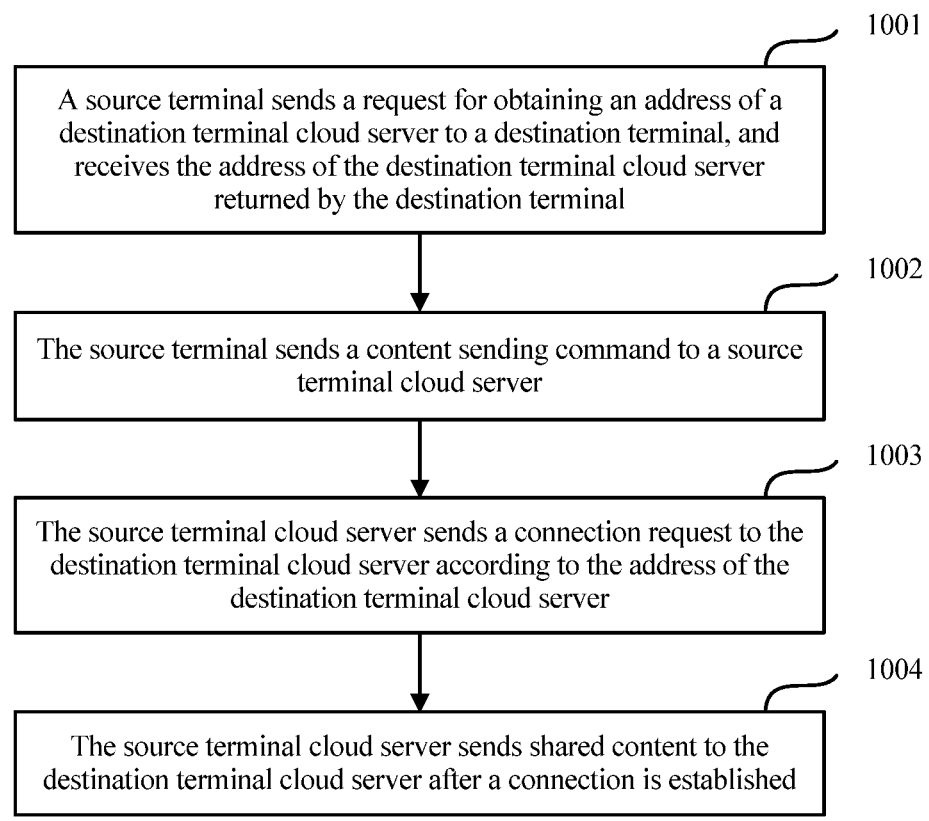
FIG. 10 is a flowchart of a content sharing method according to an embodiment of the present invention.

An embodiment of the present invention further provides a content sharing method. Referring to FIG. 10, FIG. 10 shows a flowchart of a content sharing method. The method is applied to a system that includes a source terminal, a source terminal cloud server, a destination terminal, and a destination terminal cloud server. The content sharing method includes the following steps.

Step 1001: The source terminal sends a request for obtaining an address of the destination terminal cloud server to the destination terminal, and receives the address of the destination terminal cloud server returned by the destination terminal.

Step 1002: The source terminal sends a content sending command to the source terminal cloud server, where the content sending command carries the address of the destination terminal cloud server.

Step 1003: The source terminal cloud server sends a connection request to the destination terminal cloud server according to the address of the destination terminal cloud server.

Step 1004: The source terminal cloud server sends shared content to the destination terminal cloud server after a connection is established.

In the embodiment of the present invention, before step 1002, the method further includes steps: The source terminal determines an ID of the shared content according to locally stored information, and sends the ID of the shared content to the source terminal cloud server; the source terminal cloud server obtains a corresponding random verification code according to the ID that is of the shared content and sent by the source terminal, and feeds back the ID of the shared content and the random verification code to the source terminal; and the source terminal verifies, according to the ID of the shared content and the random verification code, whether corresponding shared content locally exists in the source terminal.

In the embodiment of the present invention, that the source terminal determines, according to the ID of the shared content and the random verification code, whether the shared content is uploaded to the source terminal cloud server specifically includes: If the corresponding shared content locally exists in the source terminal, it indicates that the shared content is uploaded to the source terminal cloud server, and the step that the source terminal sends a content sending command to the source terminal cloud server is executed; or if the corresponding shared content does not locally exist in the source terminal, it indicates that the shared content is not uploaded to the source terminal cloud server, and the source terminal uploads the shared content to the source terminal cloud server. For a specific verification process, refer to an implementation manner with reference to Table 1 and Table 2 in the foregoing embodiment.

In the embodiment of the present invention, before step 1002, the method further includes a step: The source terminal sends a content sharing request to the destination terminal, and receives a response of accepting content sharing returned by the destination terminal.

In the embodiment of the present invention, after step 1004, the method further includes: operating, by the destination terminal, the shared content by using the destination terminal cloud server.

In the embodiment of the present invention, information exchange may be performed between the source terminal and the destination terminal by using an RCS server.

In the embodiment of the present invention, after shared content is transferred between cloud servers, and after a source terminal and a destination terminal respectively log in to their respective cloud servers, verify their respective login information, and log in to their respective cloud servers, the shared content may be browsed and operated. In the embodiment of the present invention, efficiency and a transfer speed of RCS content sharing are enhanced, and security of content sharing is improved.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but is not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, comprising:

receiving, by a first source cloud server, an ID of content, wherein a first source terminal sends a first request for obtaining an address of a second destination cloud server to a second destination terminal via a rich communication suite (RCS) server, wherein the first request carries an address of the first source cloud server, the RCS server records the address of the first source cloud server after receiving the first request, wherein the second destination terminal returns the address of the second destination cloud server to the first source terminal via the RCS server, wherein the first source terminal, in response to receiving the address of the second destination cloud server, sends a content sharing request to the second destination terminal via the RCS server, wherein the second destination terminal, in response to receiving the content sharing request, sends a response to the content sharing request to the first source terminal, and the response to the content sharing request indicates that content sharing has been accepted, wherein the first source terminal, in response to receiving the response to the content sharing request, determines the ID of content according to a first locally stored information of the first source terminal, and sends the ID of the content to the first source cloud server, and wherein the first locally stored information comprises the ID of the content, a second random verification code of the content, and a first file path of the content, and wherein the ID of the content and the second random verification code of the content are automatically generated by the first source terminal when the first source terminal uploads the content to the first source cloud server;

in response to receiving the ID of the content from the first source terminal, obtaining, by the first source cloud server according to the ID of the content sent by the first source terminal, a first random verification code corresponding to the ID of the content by searching a second locally stored information of the first source cloud server, and feeding back the first random verification code of the content and the ID of the content to the first source terminal, wherein the second locally stored information comprises the ID of the content, the first random verification code of the content, and a second file path of the content, and wherein the ID of the content and the first random verification code of the content are received from the first source terminal when the first source terminal uploads the content to the first source cloud server;

receiving, by the first source cloud server, a content sending command sent by the first source terminal, wherein the content sending command carries the address of a second destination cloud server serving, and the content sending command instructs the first source cloud server to send the content to the second destination cloud server, wherein the first source terminal obtains, according to the ID of the content, the second random verification code locally stored in the first source terminal by querying the first locally stored information, wherein the first source terminal performs verification between the second random verification code locally stored in the first source terminal and the first random verification code returned by the first source cloud server, wherein when the second random verification code locally stored in the first source terminal is consistent with the first random verification code returned by the first source cloud server, the first source terminal determines that the content has previously been uploaded to the first source cloud server, and when the second random verification code locally stored in the first source terminal is inconsistent with the first random verification code returned by the first source cloud server, the first source terminal determines that the content has not previously been uploaded to the first source cloud server, and wherein the first source terminal, in response to determining that the content has previously been uploaded to the first source cloud server, sends the content sending command to the first source cloud server;

in response to receiving the content sending command, sending, by the first source cloud server, a connection request to the second destination cloud server according to the address of the second destination cloud server carried in the content sending command, wherein the connection request requests to establish a connection between the first source cloud server and the second destination cloud server;

receiving, by the first source cloud server, a response to the connection request, wherein the response indicates that the connection request has been accepted; and in response to receiving the response to the connection request, determining, by the first source cloud server, a connection to the second destination cloud server has been established, and sending the content to the second destination cloud server, and wherein the second destination terminal obtains the content from the second destination cloud server; and wherein the first source terminal exchanges information with the second destination terminal via the RCS server.

2. The method according to claim 1, wherein after sending the content to the second destination cloud server, the method further comprises:

operating, by the second destination terminal, the content using the second destination cloud server.

3. The method according to claim 1, further comprising:
receiving a login request sent by the first source terminal, wherein the login request carries login verification information.

4. A method, comprising:

sending, by a first source terminal being served by a first source cloud server, a request for obtaining an address of a second destination cloud server, wherein the request is sent to a second destination terminal via a rich communication suite (RCS) server, the request carries an address of the first source cloud server, and wherein the RCS server records the address of the first source cloud server after receiving the request;

receiving, by the first source terminal, the address of the second destination cloud server returned by the second destination terminal via the RCS server, wherein the second destination cloud server serves the second destination terminal;

in response to receiving the address of the second destination cloud server, sending, by the first source terminal, a content sharing request to the second destination terminal via the RCS server, and receiving a response of accepting content sharing returned by the second destination terminal via the RCS server;

in response to receiving the response of accepting content sharing, determining an ID of content according to a first locally stored information of the first source terminal, and sending the ID of the content to the first source cloud server, wherein the first locally stored information comprises the ID of the content, a second random verification code of the content, and a first file path of the content, and wherein the ID of the content and the second random verification code of the content are automatically generated by the first source terminal when the first source terminal uploads the content to the first source cloud server;

receiving a first random verification code of the content and the ID of the content that are fed back by the first source cloud server, wherein the first source cloud server obtains, according to the ID of the content sent by the first source terminal, the first random verification code corresponding to the ID of the content by searching a second locally stored information of the first source cloud server, and feeds back the first random verification code of the content and the ID of the content to the first source terminal, wherein the second locally stored information comprises the ID of the content, the first random verification code, and a second file path of the content, and wherein the first random verification code and the ID of the content are received from the first source terminal when the first source terminal uploads the content to the first source cloud server;

in response to receiving the first random verification code of the content and the ID of the content that are fed back by the first source cloud server, obtaining, by the first source terminal according to the ID of the content, the second random verification code locally stored in the first source terminal by querying the first locally stored information;

performing, by the first source terminal, verification between the second random verification code locally stored in the first source terminal and the first random verification code returned by the first source cloud server, wherein when the second random verification code locally stored in the first source terminal is consistent with the first random verification code returned by the first source cloud server, the first source terminal determines that the content has previously been uploaded to the first source cloud server, and when the second random verification code locally stored in the first source terminal is inconsistent with the first random verification code returned by the first source cloud server, the first source terminal determines that the content has not previously been uploaded to the first source cloud server;

in response to determining that the content has previously been uploaded to the first source cloud server, sending, by the first source terminal, a content sending command to the first source cloud server, wherein the content sending command carries the address of the second destination cloud server;

sending, by the first source cloud server, a connection request to the second destination cloud server according to the address of the second destination cloud server, wherein a transmission path of the connection request from the first source cloud server to the second destination cloud server does not include the RCS server;

receiving, by the first source cloud server, a response to the connection request, wherein the response to the connection request indicates that a connection has been accepted;

in response to receiving the response to the connection request, determining, by the first source cloud server, that the connection has been established; and sending, by the first source cloud server, content to the second destination cloud server after the connection is established, wherein a transmission path of the content from the first source cloud server to the second destination cloud server does not include the RCS server, and wherein the second destination terminal obtains the content from the second destination cloud server.

5. The method according to claim 4, wherein after sending the content to the second destination cloud server, the method further comprises:
operating, by the second destination terminal, the content using the second destination cloud server.

6. A source terminal, comprising
a processor; and
a computer-readable storage medium storing a program to be executed by the processor, wherein the program includes instructions for:
sending a request for obtaining an address of a second destination cloud server to a second destination terminal via rich communication suite (RCS) server, wherein the request carries an address of a first source cloud server that serves the source terminal, and the RCS server records the address of the first source cloud server after receiving the request;

receiving the address of the second destination cloud server sent by the second destination terminal via the RCS server, wherein the second destination terminal is served by the second destination cloud server;

in response to receiving the address of the second destination cloud server, sending a content sharing request to the second destination terminal via the RCS server, and receiving a response of accepting content sharing returned by the second destination terminal via the RCS server;

in response to receiving the response of accepting content sharing, determining an ID of content according to a first locally stored information of the source terminal, and sending the ID of the content to the first source cloud server, wherein the first locally stored information comprises the ID of the content, a second random verification code of the content, and a first file path of the content, and wherein the ID of the content and the second random verification code of the content are automatically generated by the source terminal when the source terminal uploads the content to the first source cloud server;

receiving a first random verification code of the content and the ID of the content that are fed back by the first source cloud server, wherein the first source cloud server is configured to obtain, according to the ID of the content sent by the source terminal, the first random verification code corresponding to the ID of the content by searching a second locally stored information of the first source cloud server, and to feed back the first random verification code of the content and the ID of the content to the source terminal, wherein the second locally stored information comprises the ID of the content, the first random verification code, and a second file path of the content, and wherein the first random verification code and the ID of the content are received from the source terminal when the source terminal uploads the content to the first source cloud server;

in response to receiving the first random verification code of the content and the ID of the content that are fed back by the first source cloud server, obtaining, according to the ID of the content, the second random verification code locally stored in the source terminal by querying the first locally stored information;

performing verification between the second random verification code locally stored in the source terminal and the first random verification code returned by the first source cloud server;

when the second random verification code locally stored in the source terminal is consistent with the first random verification code returned by the first source cloud server, determining that the content has previously been uploaded to the first source cloud server;

when the second random verification code locally stored in the source terminal is inconsistent with the first random verification code returned by the first source cloud server, determining that the content has not previously been uploaded to the first source cloud server;

in response to determining that the content has previously been uploaded to the first source cloud server, sending a content sending command to the first source cloud server, wherein the content sending command carries the address of the second destination cloud server, wherein the first source cloud server is configured to, in response to receiving the content sending command, send a connection request to the second destination cloud server according to the address of the second destination cloud server, wherein the second destination cloud server is configured to return, to the first source cloud server, a response to the connection request, wherein the response to the connection request indicates that a connection has been accepted, wherein the first source cloud server is further configured to, in response to receiving the response to the connection request, determine the connection to the second destination cloud server has been established, and send the content to the second destination cloud server, and wherein the second destination terminal is configured to receive the content from the second destination cloud server.

7. The source terminal according to claim 6, wherein the computer-readable storage medium is further configured to store login information of logging in to a cloud server by a user, and the program further includes instructions for logging in to the first source cloud server according to the login information.

8. A first source cloud server, comprising:
a transceiver;
a processor; and
a computer-readable storage medium storing a program to be executed by the processor, content, wherein the program includes instructions for:
receiving, using the transceiver, an ID of content, wherein a first source terminal is configured to send a first request for obtaining an address of a second destination cloud server to a second destination terminal via a rich communication suite (RCS) server, wherein the first request carries an address of the first source cloud server, wherein the RCS server is configured to record the address of the first source cloud server after receiving the first request, wherein the second destination terminal is configured to return the address of the second destination cloud server to the first source terminal via the RCS server, wherein the first source terminal is configured to, in response to receiving the address of the second destination cloud server, send a content sharing request to the second destination terminal via the RCS server, wherein the second destination terminal is configured to, in response to receiving the content sharing request, send a response to the content sharing request to the first source terminal, and the response to the content sharing request indicates that content sharing has been accepted, wherein the first source terminal is configured to, in response to receiving the response to the content sharing request, determine the ID of content according to a first locally stored information of the first source terminal, and send the ID of the content to the first source cloud server, and wherein the first locally stored information comprises the ID of the content, a second random verification code of the content, and a first file path of the content, and wherein the ID of the content and the second random verification code of the content are automatically generated by the first source terminal when the first source terminal uploads the content to the first source cloud server;

in response to receiving the ID of the content from the first source terminal, obtaining, according to the ID of the content sent by the first source terminal, a first random verification code corresponding to the ID of the content by searching a second locally stored information of the first source cloud server, and feeding back the first random verification code of the content and the ID of the content to the first source terminal, wherein the second locally stored information comprises the ID of the content, the first random verification code of the content, and a second file path of the content, and wherein the ID of the content and the first random verification code of the content are received from the first source terminal when the first source terminal uploads the content to the first source cloud server:

receiving, using the transceiver, a content sending command sent by the first source terminal, wherein the content sending command carries an address of a second destination cloud server, the content sending command instructs to send the content to the second destination cloud server, wherein the first source terminal is configured to obtain, according to the ID of the content, the second random verification code locally stored in the first source terminal by querying the first locally stored information, wherein the first source terminal is configured to perform verification between the second random verification code locally stored in the first source terminal and the first random verification code returned by the first source cloud server, wherein when the second random verification code locally stored in the first source terminal is consistent with the first random verification code returned by the first source cloud server, the first source terminal is configured to determine that the content has previously been uploaded to the first source cloud server, and when the second random verification code locally stored in the first source terminal is inconsistent with the first random verification code returned by the first source cloud server, the first source terminal is configured to determine that the content has not previously been uploaded to the first source cloud server, and wherein the first source terminal is configured to, in response to determining that the content has previously been uploaded to the first source cloud server, send the content sending command to the first source cloud server;
  in response to receiving the content sending command, parsing the content sending command, to obtain the address of the second destination cloud server, and sending a connection establishment request to the second destination cloud server according to the address of the second destination cloud server carried in the content sending command, wherein the connection request requests to establish a connection between the first source cloud server and the second destination cloud server;
  receiving the response to the connection establishment request, wherein the response to the connection establishment request indicates that a connection has been accepted;
  in response to receiving the response to the connection establishment request, determining that a connection has been established; and
  sending the content to the second destination cloud server after the connection is established, wherein the second destination terminal is configured to obtain the content with the second destination cloud server; and
wherein the first source terminal exchanges information with the second destination terminal via a rich communication suite (RCS) server.

9. The server according to claim 8, wherein the program further includes instructions for recording information about a progress and a status that are of transferring the content to the second destination cloud server; and
  wherein the transceiver is further configured to feed back, to the first source terminal, the information about the progress and the status that are of transferring the content to the second destination cloud server.

10. A content sharing system, comprising:
  a first source terminal, comprising a first processor and a first computer-readable storage medium storing a first program to be executed by the first processor;
  a first source cloud server;
  a second destination terminal, comprising a second processor and a second computer-readable storage medium storing a second program to be executed by the second processor; and
  a second destination cloud server;
  wherein the first program comprises instructions for sending a first request for obtaining an address of the second destination cloud server to the second destination terminal via a rich communication suite (RCS) server, wherein the first request carries an address of the first source cloud server, and the RCS server records the address of the first source cloud server after receiving the request;
  wherein the second program comprises instructions for returning the address of the second destination cloud server to the first source terminal via the RCS server;
  wherein the first program further includes instructions for, in response to receiving the address of the second destination cloud server from the second destination terminal, sending a content sharing request to the second destination terminal via the RCS server;
  wherein the second program further includes instructions for, in response to receiving the content sharing request from the first source terminal, sending a response to the content sharing request, wherein the response to the content sharing request indicates that content sharing has been accepted;
  wherein the first program further includes instructions for, in response to receiving the response to the content sharing request, determining an ID of content according to a first locally stored information of the first source terminal, and sending the ID of the content to the first source cloud server,
  wherein the first locally stored information comprises the ID of the content, a second random verification code of the content and a first file path of the content,
  wherein the ID of the content and the second random verification code of the content are automatically generated by the first source terminal when the first source terminal uploads the content to the first source cloud server;
  wherein the first source cloud server is configured to, in response to receiving the ID of the content from the first source terminal, obtain, according to the ID of the content sent by the first source terminal, a first random verification code corresponding to the ID of the content by searching a second locally stored information of the first source cloud server, and feed back the first random verification code of the content and the ID of the content to the first source terminal,
  wherein the second locally stored information comprises the ID of the content, the first random verification code of the content and a second file path of the content,
  wherein the ID of the content and the first random verification code of the content are received from the first source terminal when the first source terminal uploads the content to the first source cloud server;
  wherein the first program further includes instructions for:
    obtaining, according to the ID of the content, the second random verification code locally stored in the first source terminal by querying the first locally stored information;
    performing verification between the second random verification code locally stored in the first source terminal and the first random verification code returned by the first source cloud server;
    when the second random verification code locally stored in the first source terminal is consistent with the first random verification code returned by the first source cloud server, determining that the content has previously been uploaded to the first source cloud server;
    when the second random verification code locally stored in the first source terminal is inconsistent with the first random verification code returned by the first source cloud server, determining that the content has not previously been uploaded to the first source cloud server;
    in response to determining that the content has previously been uploaded to the first source cloud server, sending a content sending command to the first source cloud server, wherein the content sending command carries the address of the second destination cloud server;
  wherein the first source cloud server is further configured to send a connection request to the second destination cloud server according to the address of the second destination cloud server;
  wherein the second destination cloud server is configured to return, to the first source cloud server, a response to the connection request, wherein the response to the connection request indicates that a connection has been accepted;

wherein the first source cloud server is further configured to, in response to receiving the response to the connection request, determine that the connection to the second destination cloud server has been established;

wherein the first source cloud server is further configured to send the content to the second destination cloud server after the connection is established; and wherein the second program further includes instructions for obtaining the content from the second destination cloud server.

11. The system according to claim 10, wherein the second program further includes instructions for logging in to the second destination cloud server to operate the content.

* * * * *

UNITED STATES PATENT AND TRADEMARK OFFICE
CERTIFICATE OF CORRECTION

PATENT NO. : 10,721,115 B2
APPLICATION NO. : 15/638054
DATED : July 21, 2020
INVENTOR(S) : Ding et al.

Page 1 of 1

It is certified that error appears in the above-identified patent and that said Letters Patent is hereby corrected as shown below:

In the Claims

In Column 23, Line 54, Claim 1, delete "server serving" and insert --server--.

Signed and Sealed this
Thirteenth Day of October, 2020

Andrei Iancu
*Director of the United States Patent and Trademark Office*